United States Patent [19]
Gauler

[11] Patent Number: 5,660,369
[45] Date of Patent: Aug. 26, 1997

[54] PNEUMATIC CONTROL DEVICE FOR NEEDLE VALVES IN INJECTION MOLDING SYSTEMS

[75] Inventor: Kurt Gauler, Erzhausen, Germany

[73] Assignee: Incoe Corporation, Troy, Mich.

[21] Appl. No.: 271,873

[22] Filed: Jul. 7, 1994

[30] Foreign Application Priority Data

Jul. 9, 1993 [DE] Germany .................. 43 24 275.8

[51] Int. Cl.[6] .................................................. F16K 31/143
[52] U.S. Cl. .......................... 251/63.5; 251/367; 137/468
[58] Field of Search .................................. 251/367, 63.5, 251/84; 137/468

[56] References Cited

U.S. PATENT DOCUMENTS

| | | | |
|---|---|---|---|
| 1,356,732 | 10/1920 | Murphy | 251/84 |
| 1,960,271 | 5/1934 | Lovekin | 137/468 |
| 2,021,427 | 11/1935 | Peo | 137/468 |
| 4,023,594 | 5/1977 | Kats et al. | 137/468 |
| 4,164,240 | 8/1979 | Cyphelly | 137/468 |
| 4,337,920 | 7/1982 | Parris | 251/84 |

FOREIGN PATENT DOCUMENTS

| | | |
|---|---|---|
| 2641227 | 7/1990 | France . |
| 2940044 | 10/1980 | Germany . |
| 3336203 | 4/1985 | Germany . |
| 2098535 | 11/1982 | United Kingdom . |

*Primary Examiner*—A. Michael Chambers
*Attorney, Agent, or Firm*—Brooks & Kushman

[57] ABSTRACT

A pneumatic control device for needle valves in injection molding systems. The control device has a control piston, a needle valve, a control cylinder and a cylindrical receptacle in which the control cylinder is positioned. The needle valve is adjustably secured to the piston. The control cylinder has channels for supplying and removal of pressure gas from two cylindrical chambers separated by the control piston. The control cylinder is firmly positioned against the surface of the recess in which it is situated. A plurality of seals positioned between the contact surfaces define two chambers separated from one another. A pressure gas channel is connected to each of the chambers for supply and removal of pressurized gas into and out of the chambers which control the movement of the control piston and thus the needle valve. A space is left between the recess in the control receptacle and the control cylinder in order to allow the control cylinder to shift laterally due to the occurrence of lateral forces exerted on the needle valve.

18 Claims, 2 Drawing Sheets

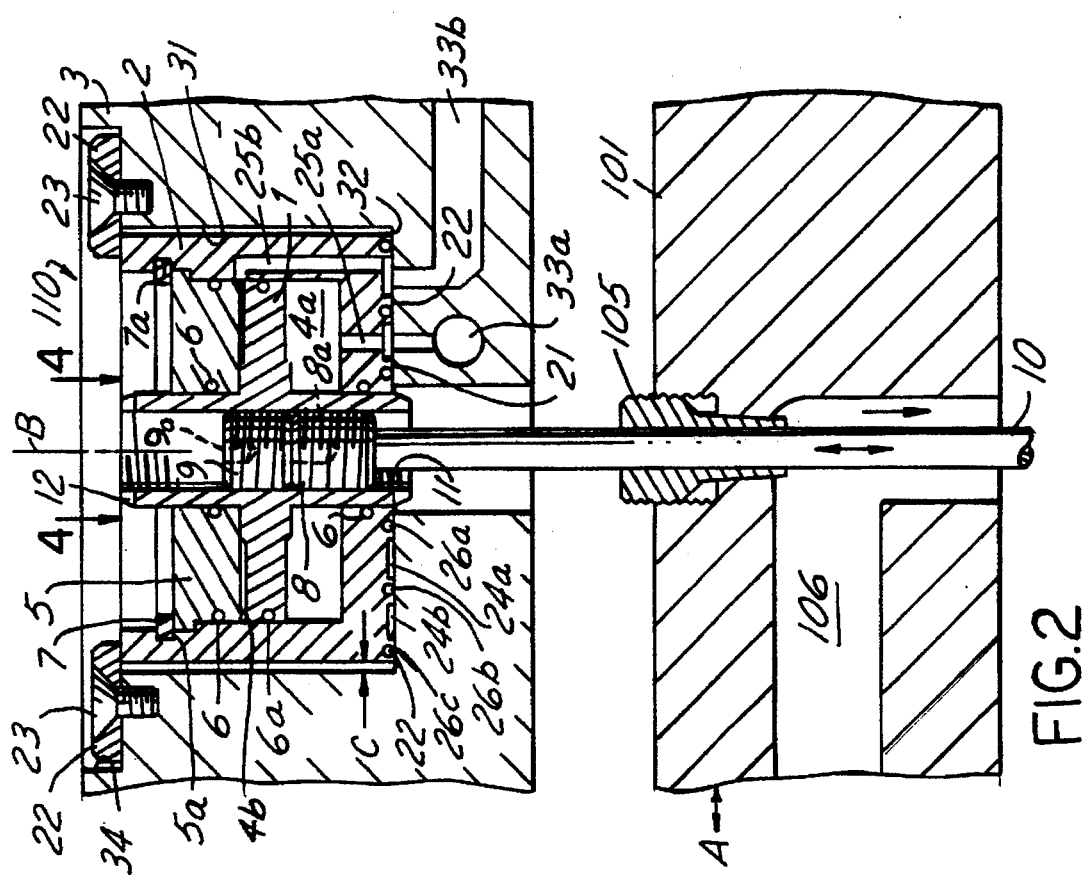
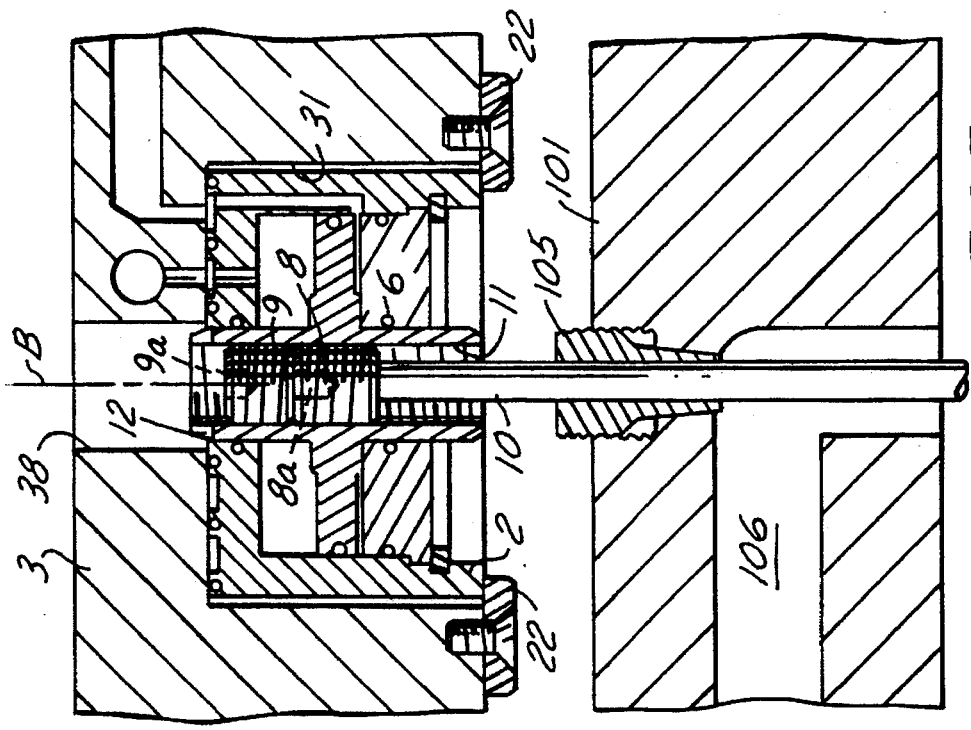

PNEUMATIC CONTROL DEVICE FOR NEEDLE VALVES IN INJECTION MOLDING SYSTEMS

TECHNICAL FIELD

The present invention relates to a pneumatic control device for valve gate bushings used in injection molding systems.

BACKGROUND ART

In conventional plastic injection molding, the molten plastic material is injected through sprue bushings into the cavity of a hollow mold. Often, two or more sprue bushings attached to a common manifold are used. In this instance, the plastic melt coming from the injection molding machine through runners is distributed by a heated distributor block (a/k/a manifold block) to the individual sprue bushings. The sprue bushings are positioned in openings of a nozzle plate which typically forms the upper half of a two-part mold. The injection mold can accommodate several cavities of the same or of different sizes, each of which is connected to a sprue bushing. Also, in the case of large work pieces, two or more sprue bushings may be connected with the same cavity in a mold.

One conventional method used to control the melt flow utilizes one or more needle valves, also known as valve gate bushings. With these systems, the needle valve is inserted through the distributor block or manifold into the sprue bushings and is controlled for axial movement by a control device or mechanism. The needle valve has an elongated pin which is moved axially by the control device or mechanism and is adapted to fit within an orifice in the end of the sprue bushing in order to open and close the passageway of plastic melt from the sprue bushing into the mold cavity. The control mechanism operates either hydraulically or pneumatically. When manufacturing certain plastic products, such as medical products, hydraulic control devices should not be used since any possibility of contact between the injection melt and the final products with oil must be avoided.

During the injection molding process, the manifold (distributor block) heats up to a higher temperature than the control mechanism and its mounting. Due to thermal expansion, the sides of the distributor block move or shift laterally relative to the control mechanism. This causes lateral forces to act on the control piston, which in turn could lead to sealing problems between the control piston and the cylinder wall. Also, due to manufacturing tolerances, alignment errors may occur between the control piston axis and the longitudinal axis of the valve needle port in the distributor block that can also lead to an irregular contact pressure of the seal between the control piston and control cylinder.

Aside from impairing and damaging the seal, the needle also may become bent. The needle has a snug fit inside the seal and sprue bushing and is sensitive to lateral forces. During the injection process, the needle or pin moves twice axially within a relatively short period of time, e.g. 20–30 seconds, in order to open and close the valve. The seal bushing also has a highly sensitive coating in order to obtain the requisite sealing power.

Another disadvantage of conventional control devices, in which the operating fluid for the piston is supplied radially through the wall of the control cylinder, is the fact that several seals are required between the exterior wall of the cylinder mantle and the cylinder receptacle. Installing the control cylinder with these seals in the cylinder receptacle is difficult and care must be taken that the seals do not become damaged during installation. To facilitate installation, it is common to design the exterior cylinder wall in several graduated layers in the axial direction. However, this results in higher manufacturing costs for the system. This disadvantage exists whether or not the needle valve passes through a manifold and whether or not alignment errors lead to lateral forces as described above.

SUMMARY OF THE INVENTION

An object of the present invention is to develop a pneumatic control mechanism for needle valves in injection molding systems which overcomes the above-described sealing problems. Another object of the present invention is to create a control device in which complicated construction of the exterior wall of the control cylinder is avoided and in which installation of the control cylinder into the cylinder receptacle is made easier.

To overcome these problems, a pneumatic control device for needle valves is presented in which the control cylinder has a lateral freedom of movement and in which the pneumatic pressure passageways are directed to the control piston parallel to the longitudinal axis of movement of the piston.

The control cylinder is positioned in a recess in the distributor block and a space is left between them in the lateral direction. The control cylinder is held in place in the recess by clamps or other conventional means, but still is allowed to shift laterally if necessary due to thermal changes. A control piston which is attached to the needle valve or pin is positioned in the control cylinder and is operated by pneumatic pressure. Chambers on each side of the control piston are in communication with a pneumatic pressure source in order to control the operation of the piston. The chambers communicate with the source of pneumatic pressure through passageways in sealed ports in the mating surfaces between the control cylinder and the recess.

The needle valve is axially adjustable relative to the control piston and means are provided to prevent rotation of the control piston when the pin is adjusted.

The present invention minimizes alignment errors in the longitudinal port of the needle valve caused by the use of manifolds. It also creates a control cylinder that is simpler and less expensive to manufacture and which can be installed more quickly and without danger of damaging any seals.

These and other objects, features and benefits of the invention will become apparent from the following description of the invention, when taken together with the drawings and appended claims.

BRIEF DESCRIPTION OF DRAWINGS

FIG. 2 illustrates a first embodiment of a pneumatic control device in accordance with the present invention;

FIG. 3 illustrates an alternate embodiment of the present invention; and

BEST MODE(S) FOR CARRYING OUT THE INVENTION

Figure 1:
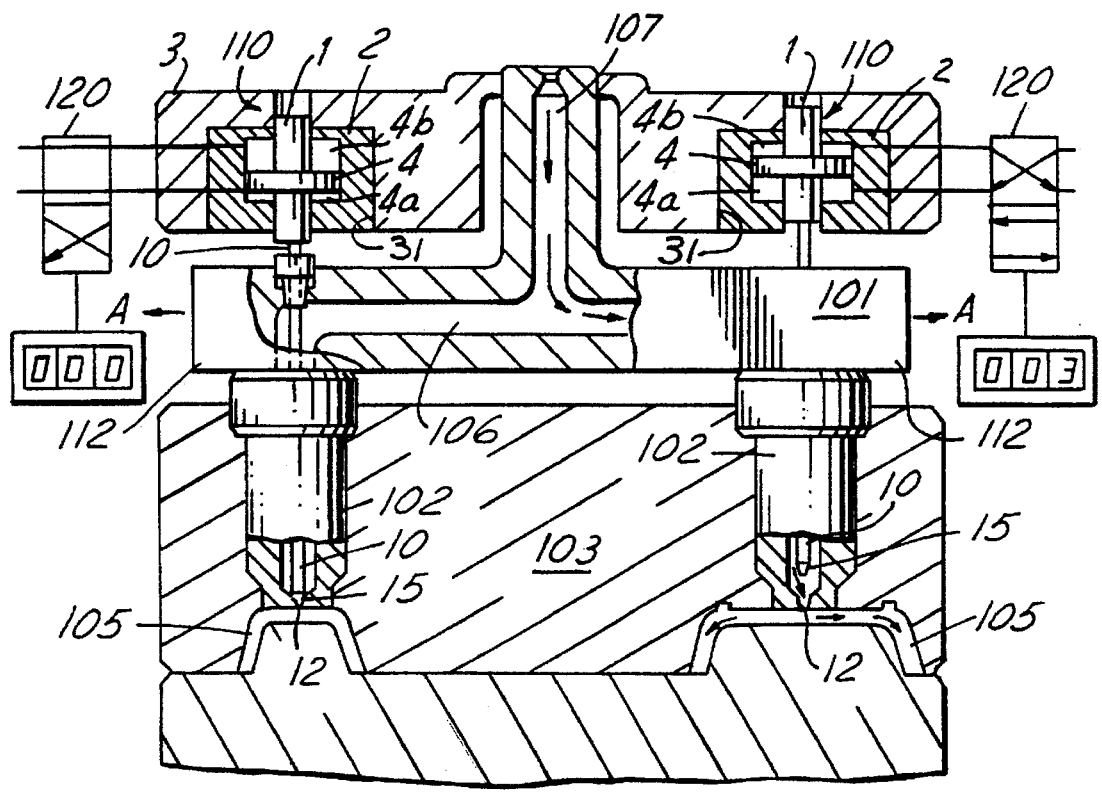
FIG. 1 illustrates a pneumatic control device for needle valves in hot runner molding systems utilizing known technology.

FIG. 1 illustrates a prior art plastic injection molding system. The plastic melt 107 is introduced into the system from a nozzle of an injection molding machine (not shown). The molten plastic material 107 is conveyed by runners 106 in a heated manifold or distributor block 101. A pair of sprue bushings 102 are positioned in openings or bores in a nozzle plate 103 which forms the upper part of a two-part hollow mold. The plastic 107 is conveyed by passage 106 through the bushings 102 into cavities 105 in the mold 103.

Needle valves or pins 10 are positioned in the sprue bushings 102 and are used to control the orifices 12 of the bushings. The ends of the pins 10 and the orifices 12 form a valve which is used to open and close the passageway for the plastic melt into the mold cavities.

The valve gate pins 10 are controlled by control mechanisms 110. The control mechanisms 110 each comprise a cylinder receptacle 3 having a cylindrical bore or recess 31. A control cylinder 2 is positioned in each of the recesses 31 and a movable control piston 1 is positioned in each of the control cylinders 2. The control pistons 1 are attached to the ends of the needle valves 10 and slide longitudinally axially in the control cylinders 2. The movement of the pistons 1 is operated either hydraulically or pneumatically by control system 120. Chambers 4a and 4b are provided on opposite sides of the pistons 1 and are used to control the movement of the piston by the control system 120. Due to the construction of the system shown in FIG. 1, a number of seals must be provided between the walls of the cylinder receptacles 3 and the control cylinders 2 in order to allow the hydraulic or pneumatic pressure from the system 120 to operate the pistons 1.

In use, the distributor block or manifold 101 is heated by conventional means (not shown) in order to maintain the plastic material 107 in its molten condition. The sprue bushings 102 also are heated in order to maintain the plastic material molten substantially throughout their length. Due to thermal expansion, the sides or end portions 112 of the manifold 101 move or shift laterally in the direction shown by the arrows "A" relative to the control mechanisms 110. This causes lateral forces to act on the control pistons 1 which in turn could lead to sealing problems between the control cylinders 2 and cylinder receptacles 3, as well as misalignment between the needle valves 10 and their respective orifices 12.

A preferred embodiment of the present invention is shown in FIG. 2. FIG. 2 shows part of the cylindrical receptacle 3 and part of the distributor block or manifold 101 through which the needle valve 10 passes and is controlled by the control device 110. The cylindrical receptacle 3 has a cylindrical bore recess 31 into which is placed a slightly smaller control cylinder 2. The size difference or space between the members 2 and 3 is shown by the dimension "C". An axially movable control piston 1 is positioned in the control cylinder 2. In the embodiment shown in FIG. 2, the control piston 1 is insertable into the control cylinder from above.

The piston 1 is held in place in the control cylinder 2 by cover member 5. Cover member 5 is tightly positioned in the control cylinder 2 by means of shoulder 5a and snap ring 7. Snap ring 7 fits within circular grooves 7a in cylinder 2.

Cylindrical chambers 4a and 4b are formed in the control cylinder 2 on opposite sides of the control piston 1. In the position shown in FIG. 2, the upper cylindrical chamber 4b has its smallest possible volume while the lower cylindrical chamber 4a has its largest possible volume.

The control cylinder 2 is held in place in the recess or bore 31 of the cylindrical receptacle 3 by a plurality of clamping members 22 held in place by set screws or clamping bolts 23. The clamping members hold the control cylinder 2 tightly in the recess 31, so that surface 32 in the recess 31 is pressed tightly against the front mating surface 21 of the control cylinder 2.

The surface 21 of the control cylinder 2 is equipped with three angular tee-slots or grooves 22 which are concentric to the cylinder's longitudinal axis "B". Sealing ring washers 26a, 26b and 26c are positioned in the tee slots or grooves 22 and used to seal the two surfaces 21 and 32.

Also on the surface 21 of the control cylinder 2, are two concentric grooves or slots 24a and 24b, which also are called "port chambers". The slots 22 are flat ring-like slots and are concentric to the cylinder's longitudinal axis B. The seals 26a, 26b and 26c isolate and seal the two port chambers 24a and 24b from each other.

A pressure gas channel 25a extends between the lower cylindrical chamber 4a and port chamber 24a. Pressure gas channel 25b extends between port chamber 24b and the upper cylindrical chamber 4b. Channel 25b is positioned essentially parallel to longitudinal axis B and is situated in the wall of the control cylinder 2. The two port chambers 24a and 24b have pneumatic connections with pressure gas passageways 33a and 33b, respectively, which are positioned in the cylindrical receptacle 3. The pressure gas passageways deliver and remove pressurized gas from a pneumatic source (not shown). If the present invention is used in a hydraulic system, then passageways 33a and 33b would be used to deliver and return oil or another hydraulic fluid from the chambers 4a and 4b.

As indicated, the control cylinder 2 essentially "floats" in the recess 31 of the cylindrical receptacle 3. In this manner, if the distributor block or manifold 101 moves or shifts laterally in the direction of the arrow A relative to the control receptacle 3 due to heating, then the control cylinder 2, together with the control piston 1, can move correspondingly in a lateral direction.

Also present are a number of conventional seals 6 positioned between the control cylinder 2 and cover member 5, the control piston 1 and the cover member 5, and the control cylinder 2 and the control piston 1. These seals prevent the escape of the hydraulic or pneumatic fluid from the chambers 4a and 4b. Seal 6a prevents the fluid in the chambers 4a and 4b from passing from one chamber to the other.

With the present invention, the seals 6 between the control piston recess, the cover member and the control piston are not subject to lateral forces. The seals are not too strongly or too irregularly stressed by thermal expansion of the manifold or as a result of manufacturing tolerances. Of course, the pressure set by the clamping members 22 through the set screws or clamping bolts 23 must not be such as to prevent movement of the control piston 2 in the recess 31. Pressure by the clamping members 22 should be set to provide the appropriate sealing function between the surface 21 of the control cylinder 2 and the surface 32 of the recess 31, but still allow lateral movement in the event of thermal expansion by the manifold 101.

The embodiment of the invention shown in FIG. 3 is similar to the embodiment shown in FIG. 2, except that the cylindrical receptacle and the control cylinder 2 have been turned 180°. In this embodiment, the clamping members 22 for securing the control cylinder 2 in the recess 31 are now located between the cylinder receptacle 3 and the manifold distributor block 101. In this position, the clamping members 22 do not protrude outside the molding system and do not need to be hidden in a recess, such as recess 34 in cylindrical receptacle 3 shown in FIG. 2. This permits the height of the receptacle 3 and thus the total height of the molding system shown in FIG. 3 to be slightly smaller and lower than in the embodiment shown in FIG. 2.

Figure 4:
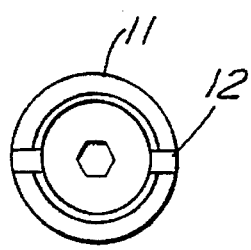
FIG. 4 depicts a top view of the end of the control piston containing the needle valve, taken in the direction of the arrows 4—4 in FIG. 2.

With the present invention, the needle valve 10 is secured in the control piston 1 in a certain manner. The control piston 1 has an internal bore or passageway 11 which is threaded. An adjustment screw 8 is attached to the upper end of the needle valve 10 and has threads corresponding to the threads of the cylindrical bore 11. The adjustment screw 8 is screwed into the opening 11 in the control piston 1. In order to prevent the piston 1 from rotating together with the adjustment screw 8 when the needle valve 10 is positioned therein, a pair of diametrically opposed slots 12 are contained in the upper end of the piston 1 (as shown in FIG. 4). By inserting a suitable device, such as a screwdriver or key member, axial rotation of the piston is prevented during the rotation of the adjustment screw 8. In this regard, in order to rotate the screw 8, a wrench-like recess, such as a square or hexagonal socket 8a, is provided in one end. A conventional socket or allen wrench or the like can then be inserted in the screw 8 and the screw 8 rotated relative to the control piston 1 in order to move the needle valve 10 axially in the molding system.

In view of the opening in the upper end of the cylindrical receptacle 3, such as recesses 34 and 31 in FIG. 2 and bore 38 in FIG. 3, the needle valve 10 can be installed in and removed from the system, as well as adjusted therein, without disassembly of the system. The adjustment of the needle valve 10 can also be carried out after the complete assembly of the cylindrical receptacle 3, control cylinder 2 and control piston 1.

Also positioned in the bore 11 is a counterscrew 9 which is used to prevent rotation of the adjustment screw 8 during use. The counterscrew 9 also preferably has a socket or recess 9a of a conventional type in order to allow easy adjustment and removal.

In order to axially adjust the needle valve 10 to its operable position, the control piston 1 is put in the position that would be the lowest relative to the molding systems shown in FIGS. 2 and 3. Then the needle valve 10, through rotation of the adjustment screw 8 is turned far enough in the direction of the mold cavity until the tip of the needle valve is seated in the orifice at the end of the sprue bushings. The precise positions of the end and the orifice depend on the type of screw bushing used. Thereafter, the adjustment screw 8 is turned back slightly, for example, one rotation, and finally the counterscrew 9 is rotated into the bore 11 for securing the position of the adjustment screw 8. During this process, the control piston 1 is prevented from co-rotating through use of the slots 12.

It is understood that persons skilled in the art could make changes to the precise structure and system shown in the FIGS. 2–4, and still incorporate the substance of the present invention. Several of these changes are set forth below.

The floating operation of the control cylinder 2 in the cylinder receptacle 3 should be perpendicular to the longitudinal axis B of the piston. The clearance C between the control cylinder 2 and the recess 31 in the cylindrical receptacle can be determined by alignment errors that are expected due to manufacturing tolerances and/or thermal expansion. The minimum size for the clearance C could be determined in that manner. In this regard, the recess opening 31 in the cylindrical receptacle 3 does not have to be a cylindrical bore or recess. It is only necessary that the surface 32 of the recess 31 and the surface 21 of the control system 2 be in contact and be held together by a clamping force or mechanism in some manner.

Due to the manner in which the control cylinder 2 moves laterally relatively to the control receptacle 3, it is not possible to connect the cylindrical chambers 4a and 4b to pressure gas cylinders in the vertical cylindrical walls of the recess 31. Instead, the pressure gas channels are connected to the chambers 4a and 4b at the intersection of surfaces 21 and 32. As described above, these connections comprise port chambers 24a and 24b which are sealed from one another by seals 26a, 26b and 26c in grooves or slots 22.

It is also understood that the port chambers 24a and 24b, as well as the grooves or slots 22, may be situated in the contact surface 32 of recess 31, rather than in the surface 21 of the control cylinder 2. The operation of the invention would be the same and the same results, benefits and advantages would be achieved.

It is further understood that the port chambers 24a and 24b do not have to be ring-shaped around the longitudinal axis B. For example, two separate recesses could be provided on the surface 21 of the control cylinder 2, each recess surrounded by a seal. The gas pressure channels 25a and 25b would then extend from the ports through the walls of the control cylinder to the chambers 4a and 4b and also to the pressure gas lines 33a and 33b from the cylindrical receptacle 3. The advantage of having two ring-shaped seals and ring-shape port cylinders concentrically situated with respect to the longitudinal axis B, is that it is not necessary to position the rotation angle of the control cylinder 2 in relation to the cylinder receptacle 3 during assembly. The concentric port chambers 24a and 24b allow the control cylinder 2 and receptacle 3 to be assembled in any position 360° relative to one another.

For forming the port chambers 24a and 24b, it is not necessary that seals be arranged concentrically to the piston axis B. In principle, it suffices that the surface 21 of the control cylinder 2 has two areas by means of seals isolate the port chambers, thereby creating two areas that are closed off from the rest of the contact area between surfaces 21 and 32 and in which then is formed one port chamber each for forming a recess.

Also, as would be understood to persons of ordinary skill in the art, if the seals 26a, 26b and 26c protrude a sufficient distance from the surface 21 of the control cylinder 2, the formation of slots or recesses for port chambers 24a and 24b, whether in surfaces 21 or 32, may not be necessary. The spaces between seals 26a and 26b and between 26b and 26c would provide sufficient chambers for utilizing the present invention.

Also, the channels 25a and 25b do not necessarily have to be parallel to the longitudinal axis B, although this is the preferred embodiment. The main requirement is that the channels 25a and 25b connect pneumatically with the port chambers and with the appropriate cylinder chamber 4a or 4b.

It is also possible that the interlocking holding device for receiving the clamping tool can be designed differently from the two opposed slots 12 shown in FIGS. 2–4. In this regard, any interference device which could be used to prevent piston 1 from rotating relative to the screw 8 could be utilized.

Further, the clamping members or devices used to press surface 21 of control cylinder 2 against surface 32 of recess 31 of control receptacle 3 can be designed differently. Rather than provide separate clamping members 22 and set screws or clamping bolts 23, a force transfer ring or other clamping device could be secured to the cylinder receptacle 3, so long as a sufficient clamping force is provided.

Further, it is possible that there could be more than two port chambers associated with the pressure gas channels in the control cylinder and the pressure gas lines in the cylinder receptacle. Here, two or more port chambers may be connected to the same cylinder chamber.

The applicability of the control device or mechanism in accordance with the present invention is not restricted to pneumatic control devices for needle valves and hot runner molding systems. Instead, it can be used anytime where alignment errors may occur in the receiving port of an extended piston rod, or where a control cylinder is desired which is simple in terms of manufacture and/or assembly.

Although particular embodiments of the present invention have been illustrated in the accompanying drawings and described in the foregoing detailed description, it is to be understood that the present invention is not to be limited to just the embodiments disclosed, but that they are capable of numerous rearrangements, modifications and substitutions without departing from the scope of the claims hereafter.

It is claimed:

1. A control device for injection molding systems, said control device having a longitudinal axis, comprising:

a receptacle member having a chamber means therein, said chamber means having a first surface substantially perpendicular to said longitudinal axis;

a control member positioned in said chamber means, said control member having a second surface in mating relationship with said first surface;

means for allowing movement of said control member in said chamber means substantially perpendicular to said longitudinal axis;

a movable piston member in said control member;

needle valve member attached to said piston member and movable therewith;

first and second port chambers in either said first surface or said second surface for supplying and removing pressurized fluid in said chamber means for moving said piston member in an axial direction;

sealing means for isolating and sealing said first and second port chambers from each other;

whereby lateral forces acting on said needle valve member cause corresponding lateral movement of said control member in said chamber means.

2. The control device of claim 1 wherein said needle valve member is longitudinally adjustable relative to said piston member.

3. The control device of claim 2 further comprising means for holding said piston member from rotating while adjusting said needle valve member.

4. The control device of claim 2 further comprising a threaded opening in said piston member, and said needle valve member is threaded positioned in said opening.

5. The control device of claim 4 further comprising an adjustable screw in said opening for securing the position of said needle valve member in said opening.

6. The control device of claim 2 wherein said piston member has an upper end and further comprising means for adjusting said needle valve member through the upper end.

7. The control device of claim 1 further comprising first and second pressure chambers in said control member on opposite sides of said piston.

8. The control device of claim 1 further comprising means to press said first and second surfaces together.

9. The control device of claim 8 wherein said means to press comprises at least one clamping member.

10. The control device of claim 1 further comprising a pair of passageways in fluid communication with said first and second port chambers and oriented in the direction of said longitudinal axis.

11. The control device of claim 1 wherein said first and second port chambers are concentric grooves.

12. A control mechanism for a shut-off valve in a hot runner injection molding system, said mechanism having a longitudinal axis, a control housing positioned in a chamber, a piston member axially movably positioned in said control housing, an elongated valve shut-off pin member connected to said piston member and movable therewith, and conduit means for supplying and removing pressurized fluid from said control housing for axially moving said piston member in said control housing, the improvement comprising:

said control housing and said chamber having mating surfaces oriented substantially perpendicular to said longitudinal axis;

said conduit means comprising a first passageway means for supplying and removing fluid through said mating surfaces to a first side of said piston member, and a second passageway means separate from said first passageway means for supplying and removing fluid through said mating surfaces to a second side of said piston member;

sealing means positioned between said mating surfaces for separating said first and second passageway means; and means for allowing limited movement of said control housing in said chamber substantially perpendicular to said longitudinal axis.

13. The control mechanism as set forth in claim 12 wherein said pressurized fluid comprises a pneumatic fluid.

14. The control mechanism as set forth in claim 12 further comprising means for retaining said control housing in said chamber such that said mating surfaces are pressed together.

15. The control mechanism as set forth in claim 12 wherein said first passageway means includes a first port chamber in said mating surfaces and said second passageway means includes a second port chamber in said mating surfaces.

16. The control mechanism as set forth in claim 15 wherein said first and second port chambers are formed as recesses in said control housing.

17. The control mechanism as set forth in claim 12 wherein said sealing means comprise concentric seal members isolating said first and second passageway means from each other and from said chamber.

18. The control mechanism as set forth in claim 12 further comprising means for axial adjusting said pin member relative to said piston member, and means for preventing rotation of said piston member when said pin member is being adjusted.

* * * * *